UNITED STATES PATENT OFFICE.

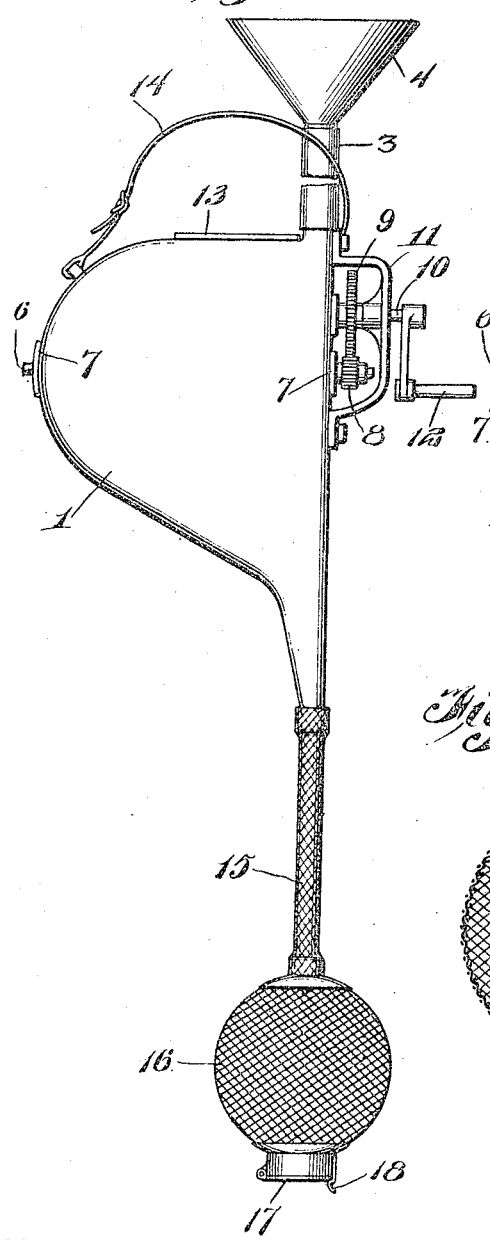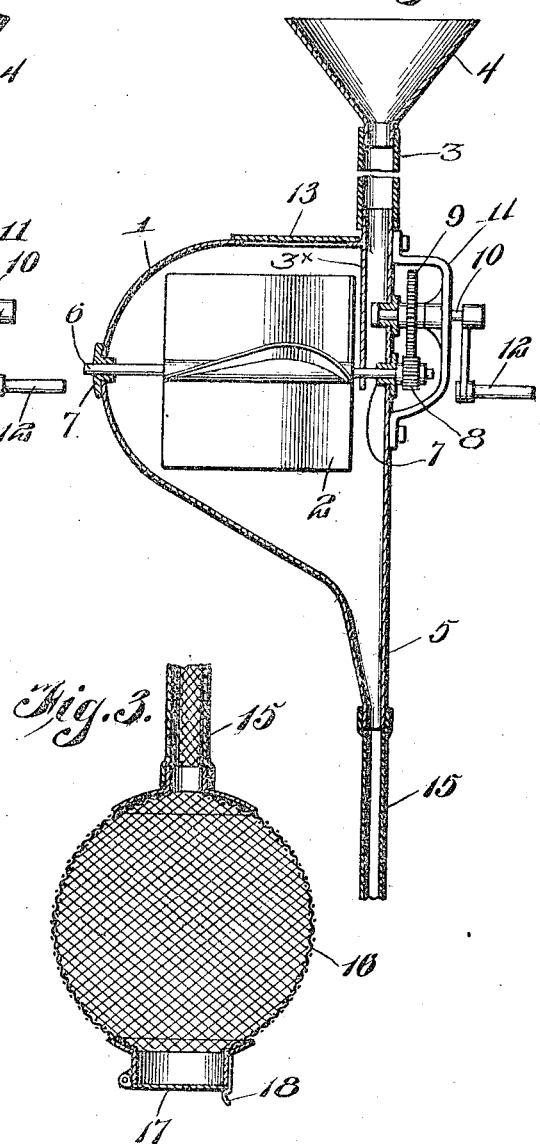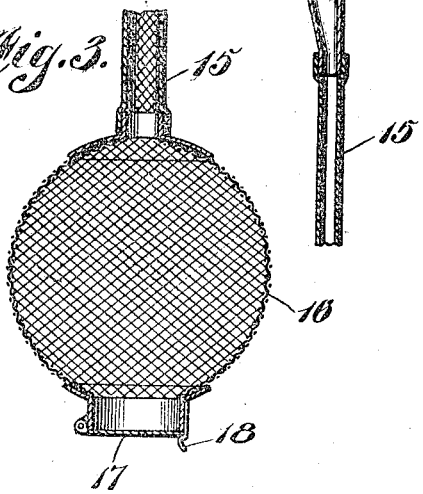

JOHN B. LAUEN, OF MOUNTAIN PARK, OKLAHOMA.

FLY-TRAP.

1,289,825.

Specification of Letters Patent.   Patented Dec. 31, 1918.

Application filed March 2, 1917.   Serial No. 152,091.

*To all whom it may concern:*

Be it known that I, JOHN B. LAUEN, a citizen of the United States, residing at Mountain Park, in the county of Kiowa and State of Oklahoma, have invented new and useful Improvements in Fly-Traps, of which the following is a specification.

This invention relates to a new and improved fly trap, and one of its objects is to provide a fly trap which is simple of construction, reliable and efficient in action and embodies suction means whereby the flies may be drawn into the trap and destroyed.

Another object is to provide a portable fly trap which may be handled and operated wherever desired, so that all flies within a room or apartment of a dwelling, a stable, or other place may be caught and exterminated.

The invention consists of the features of construction, combination and arrangement of parts herein fully described and claimed, reference being had to the accompanying drawing in which:—

Figure 1 is a view of the apparatus as adapted for use.

Fig. 2 is a vertical longitudinal section thereof.

Fig. 3 is a detail section through the conducting tube and cage or trap.

The improved fly catcher is of the portable type and comprises a body 1, which is in the form of a casing containing a suction and discharge fan 2. At its upper or forward portion the fan casing is provided with an inlet tube or conduit 3 which communicates with a suction nozzle 4, and at its rear or lower end the casing is provided with a discharge tube or conduit 5.

Arranged within the casing is a shaft 6 which carries the fan 2 and which is journaled in suitable bearings 7. One end of this shaft projects externally of the casing and carries a gear wheel 8 meshing with a pinion 9 on a driving shaft 10 journaled in the casing and in an exterior bearing bracket 11 and provided with an actuating crank handle 12. By means of this handle the shaft 6 may be revolved to actuate the fan 2, the gearing thus described being of a high speed type to insure sufficient rapidity of action of the fan to form a partial vacuum of high efficiency within the casing 1. As a result an efficient degree of suction will be produced to cause an inrush of air through the nozzle 4, which current of air will carry with it all flies or insects within a certain range or distance from the nozzle as will be readily understood. The casing is of air-tight character, but includes a suitable cover 13 whereby access to the interior thereof for the purpose of cleaning the same may be obtained. The device is provided with a shoulder strap 14 whereby it may be suspended from the shoulders of the wearer or operator so that it may be carried from point to point and manipulated in a ready and convenient manner.

The discharge tube 5 telescopically receives an elastic inlet tube 15 communicating with a cage or trap 16 of wire screen material or other suitable material, into which the sucked in flies or other insects are forced by the blast of the fan from the casing and through the tubes 5 and 15. This cage may be of any suitable dimensions and properly constructed to permit the flies to be exterminated after being trapped. The exterminated flies may be discharged or removed through a suitably closed door 17, which may be secured in position by any preferred type of fastening 18.

As shown in the drawing the inner tube and the discharge tube are in the same vertical plane at one end of the casing and the bottom of said casing slopes downwardly to the said outlet tube. A baffle plate $3^x$ forms a continuation of the inlet tube and said plate extends to a point beyond the axle of the fan. In this way the rotation of the fan causes a suction through the inlet tube and the insects sucked in through said tube will drop into the outlet tube without passing into the main part of the casing.

In the use of the device it is supported upon the person of the operator who carries it from point to point throughout a room or apartment of a dwelling, stable, or other compartment to be rid of flies, and the nozzle 4 arranged wherever desired to form a suction zone, the crank being operated to drive the fan and thus produce the desired suction and discharge action. It will be evident that the flies arranged within the suction zone of the nozzle will be drawn into the fan casing and thence forced into the trap or cage 16, from which they may be subsequently removed after being destroyed. Through the operation of the device flies within any and all the rooms of a dwelling or other edifice may be quickly and conveniently entrapped and destroyed, without the necessity of employing expensive apparatus or methods for this purpose or through the poisonous or other objectionable destroying agents.

I claim:—

A fly catcher comprising a casing, a suction tube connected with the top of said casing at one end thereof, an outlet tube leading from the bottom of said casing at the other end thereof, said tubes having their inner ends in the same vertical plane and the bottom of the casing sloping downwardly toward said outlet tube, a fan in said casing having a horizontal axis centrally located in the casing, means for operating the fan and a baffle plate located adjacent one end of the fan and forming a continuation of the inlet tube and extending beyond said axis.

In testimony whereof I affix my signature in presence of two witnesses.

JOHN B. LAUEN.

Witnesses:
 WARREN BAILEY,
 T. W. WOODY.

Copies of this patent may be obtained for five cents each, by addressing the "Commissioner of Patents, Washington, D. C."